United States Patent
Peairs et al.

[11] Patent Number: 6,085,205
[45] Date of Patent: Jul. 4, 2000

[54] CALENDAR INCORPORATING DOCUMENT RETRIEVAL INTERFACE

[75] Inventors: Mark Peairs, Menlo Park; Jonathan J. Hull, Cupertino; Kiyoshi Suzuki, San Jose, all of Calif.

[73] Assignees: Ricoh Company Limited, Japan; Ricoh Corporation

[21] Appl. No.: 08/968,694

[22] Filed: Nov. 12, 1997

[51] Int. Cl.⁷ .................................................. G06F 17/30
[52] U.S. Cl. ......................... 707/530; 707/900; 707/104
[58] Field of Search .................................. 707/530, 900, 707/104

[56] References Cited

U.S. PATENT DOCUMENTS

| | | | |
|---|---|---|---|
| 5,383,029 | 1/1995 | Kojima ................................... | 358/403 |
| 5,809,318 | 9/1998 | Rivette et al. ......................... | 707/512 |
| 5,867,150 | 2/1999 | Bricklin et al. ........................ | 345/173 |
| 5,936,625 | 8/1999 | Kahl et al. ............................. | 345/351 |
| 5,940,844 | 8/1999 | Cahill et al. ........................... | 707/526 |

OTHER PUBLICATIONS

Pier, K. (ed), *Active Badge Panel*, Proceedings of the Conference on Organizational Computing Systems, Atlanta, Georgia, Nov. 5–8, 1991, pp. 285–287.

Peairs, M., *Iconic Paper*, Proceedings of the Third International Conference on Document Analysis and Recognition, Aug., 1995, Montreal, pp. 1174–1179.

Mackinlay, J., Robertson, G., DeLine, R., Developing Calender Visualizers for the Information Visualizers for the Information Visualizer, UIST '94, Nov. 2–4, 1994, pp. 109–118.

Rao, R., Card, S.K., Johnson, W., Klotz, L., Trigg, R.H., Protofoil: Storing and Finding the Information Worker's Paper Documents in an Electronic File Cabinet, Conference Proceedings of CHI '94, Boston, pp. 180–185.

*Primary Examiner*—Wayne Amsbury
*Attorney, Agent, or Firm*—Townsend and Townsend and Crew LLP

[57] ABSTRACT

A calendar-based user interface for electronically stored documents is provided by virtue of the present invention. Each document has an associated time. A calendar view is constructed including an icon representing a particular document. The icon is presented at a location corresponding to the time of the document. In one embodiment, the calendar view includes a month view with each date having a corresponding area for presentation of document icons for documents processed on that date.

55 Claims, 7 Drawing Sheets

FIG. 5

CALENDAR INCORPORATING DOCUMENT RETRIEVAL INTERFACE

BACKGROUND OF THE INVENTION

The present invention relates to accessing electronically stored documents, and more particularly to a user interface for accessing electronically stored documents.

The increasing prevalence of electronic document storage raises the problem of providing access to electronically stored documents. One typical document retrieval interface approach is keyword searching. Another standard approach is to provide a hierarchical filing system, allowing, or rather requiring users to categorize documents into a tree structure, that then may allow efficient document recovery.

Both approaches have well-known problems. Keyword search typically returns unneeded documents in which the search term happens to appear. And the choice of a single categorization hierarchy does not support all the natural ways of viewing a database. In addition, neither of these methods facilitate application of the natural human ability to recognize documents rapidly based on general visual appearance, such as when flipping pages.

As a result, a number of other approaches have been developed. For example, there has been work in the area of retrieving documents based on icons. The user is presented with icons representing documents in a database. Based on the appearance of the icon, the user selects a particular document for display.

The representation of large document databases with icons raises new problems. Office workers must frequently process and organize large numbers of documents. Presenting the database at even the iconic size presents a substantial search problem to the user, who must then select from a large number of icons. Furthermore, different versions of a document may appear substantially similar visually making the choice of the correct icon difficult.

SUMMARY OF THE INVENTION

A calendar-based user interface for electronically stored documents is provided by virtue of the present invention. Each document has an associated time. A calendar view is constructed including an icon representing a particular document. The icon is presented at a location corresponding to the time of the document. In one embodiment, the calendar view includes a month view with each date having a corresponding area for presentation of document icons for documents processed on that date.

In accordance with one aspect of the present invention, a method is provided for accessing a document image. The method includes steps of: receiving information indicating a time associated with a document image, and forming a calendar view. The calendar view shows an icon representing the document image at a location determined by the time associated with the document image.

The invention will be better understood by reference to the following detailed description in connection with the following drawings.

BRIEF DESCRIPTION OF THE DRAWINGS

FIG. 5 depicts a monthly calendar view display according to one embodiment of the present invention.

DESCRIPTION OF SPECIFIC EMBODIMENTS

Figure 1:
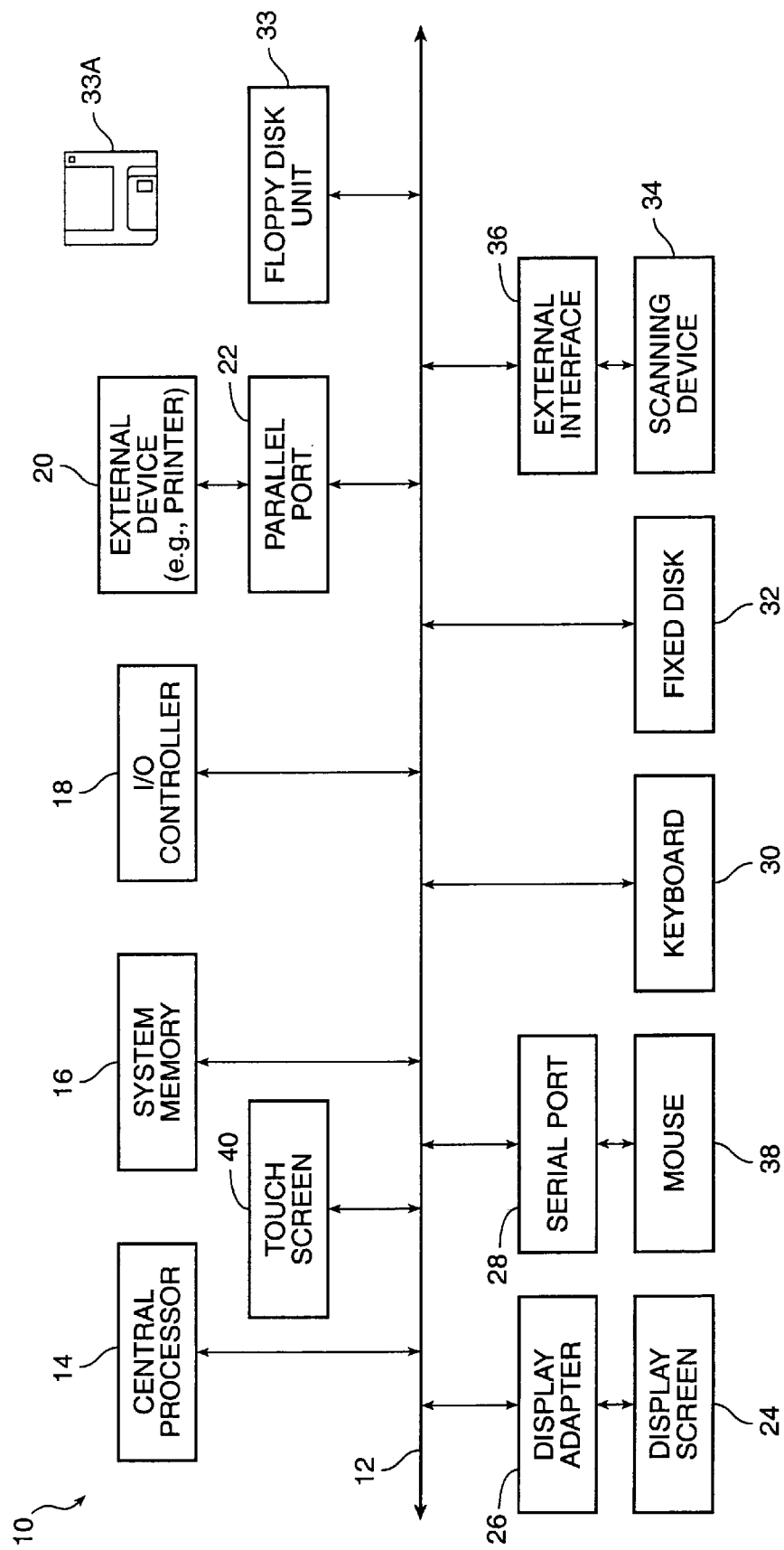
FIG. 1 depicts a computer system suitable for implementing the present invention.

FIG. 1 shows basic subsystems of a computer system suitable for use with the present invention. In FIG. 1, computer system 10 includes bus 12 which interconnects major subsystems such as a central processor 14, a system memory 16, an input/output (I/O) controller 18, an external device such as a printer 20 via parallel port 22, display screen 24 via a display adapter 26, a serial port 28, a keyboard 30, a fixed disk drive 32 and a floppy disk drive 33 operative to receive a floppy disk 33A. Many other devices can be connected such as a scanning device 34 connected via an external interface 36, a mouse 38 connected via a serial port 28 and a touch screen 40 connected directly. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A.

Figure 2:
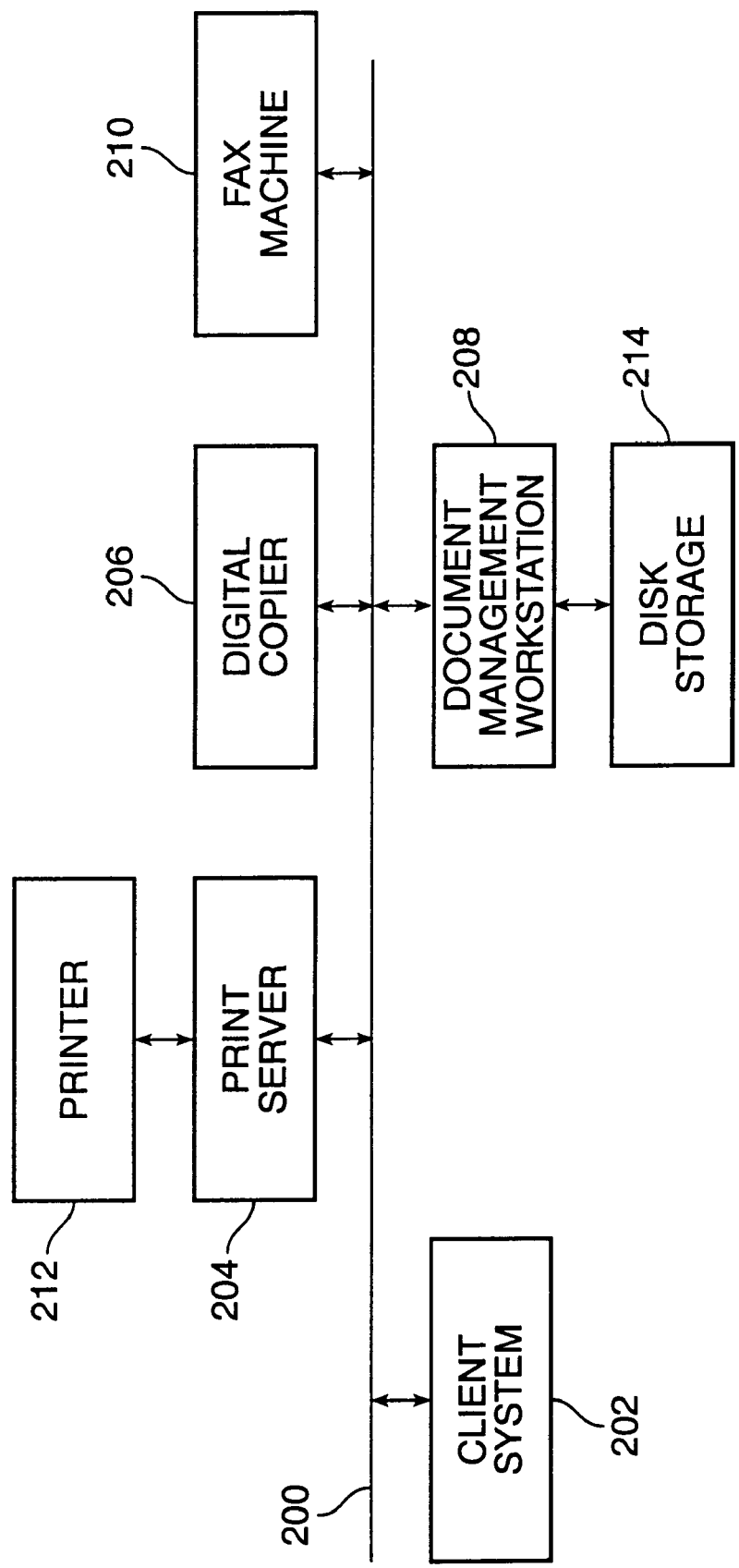
FIG. 2 depicts an office network suitable for implementing the present invention.

FIG. 2 depicts an office network suitable for implementing the present invention. A network 200 may be implemented in any way, e.g., an Ethernet. Network 200 interconnects a representative client system 202, a print server 204, a special digital copier 206, a document management workstation 208, and a special facsimile machine 210. Print server 204 controls printing on a representative printer 212 at the request of client system 202 and relays document image data to document management workstation 208 for archiving. Digital copier 206 copies documents and transmits image data obtained during the course of copying to document management workstation 208 for archiving. Similarly, facsimile machine 210 captures image data during the course of sending and receiving documents and transmits the image data to document management workstation 208 for archiving. Document management workstation 208 collects the document image data collected from all of the office equipment and maintains an archive on a disk storage unit 214. Client system 202 may browse this archive. Client system 202 preferably includes an HTTP compatible browser program to facilitate browsing of the archive and use of the interface features provided by the present invention.

The operation of document management workstation 208 for automatic archiving is explained in great detail in AUTOMATIC AND TRANSPARENT DOCUMENT ARCHIVING U.S. application Ser. No. 08/754,721, the contents of which are incorporated herein by reference. In general, many document processing operations result in archiving by document management workstation 208. This may include faxing, printing, copying, and retrieval of a document from the Internet. The problem then is navigation through the resulting document image database.

Figure 3:
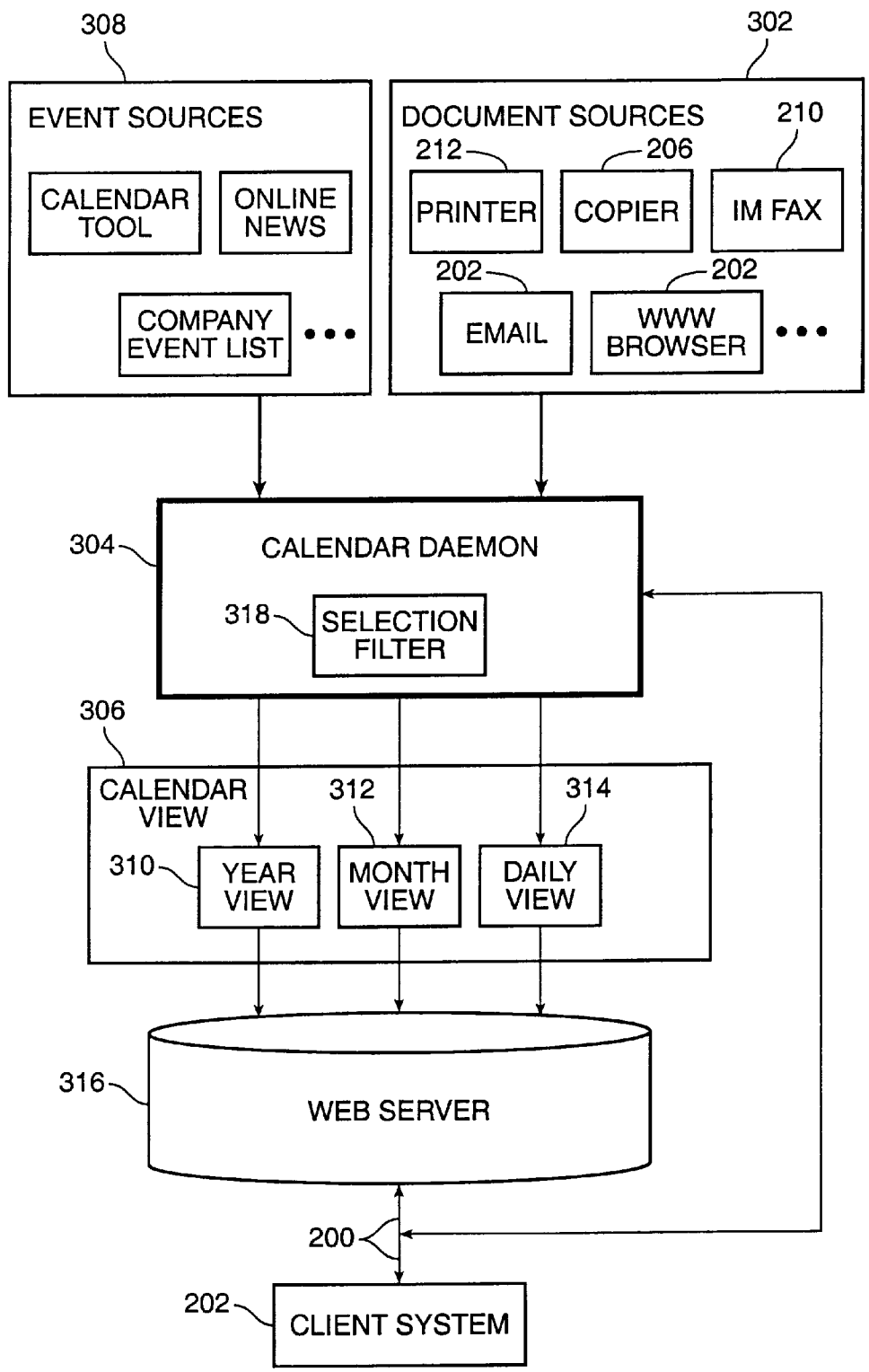
FIG. 3 depicts a data flow for construction of a calendar view according to one embodiment of the present invention.

By virtue of the present invention, a calendar view of the document database is formed to facilitate retrieval of desired documents. FIG. 3 depicts a data flow for formation of a calendar view according to one embodiment of the present invention. Document sources 302 include documents printed by printer 212, copied by digital copier 206, faxed via fax machine 210, received over the Internet by client system 202 or transmitted/received via e-mail by client system 202. As these documents are archived, they are also processed by a calendar daemon 304.

Calendar daemon 304 updates a calendar view 306 in response to documents generated by document sources 302. Calendar view 306 includes for each document, a document icon and a time to be associated with the document. The associated time may be a time of processing by one of document sources 302.

Another source of times to be associated with documents is a graphical user interface (GUI) operating on client system 202 which allows users to associate documents with events in the future. This GUI may be incorporated in the browser on client system 202.

Calendar daemon 304 also obtains information about non-document related events. Sources 308 of information about non-document related events include an event database that includes national holidays, company vacations, news events, etc. News events may be extracted from online news services. Another source of event information is a user's personal information manager where he or she records scheduled events. The user may choose to display only the events that have the highest importance or only events of a particular type. Calendar daemon 304 updates calendar view 306 in response to textual information received from sources 308. For each non-document related event, textual information about the event and a time of the event are stored.

Calendar view 306 preferably includes a year view 310, a month view 312, and a daily view 314. The views are preferably stored on a web server 316 and are accessible via HTTP requests via network 200. They may also be generated on demand.

Calendar daemon 304 preferably includes a selection filter 318 to determine which types of documents are to be stored in the views. For example, the types of documents may include invoices, checks, e-mail, scientific papers, etc. The user may choose that only documents of certain types are to be included in calendar view 306. This may be controlled by modifications to a user preference file. One user may indicate that all document types are intermixed on one display and another may indicate that separate views should be generated for scientific papers and e-mail. The user may also interactively, via commands issued on the WWW browser, set the parameters of selection filter 318. This causes calendar daemon 304 to generate calendar views consistent with the parameters. These calendar views are then immediately available for display on the browser.

Figure 4:
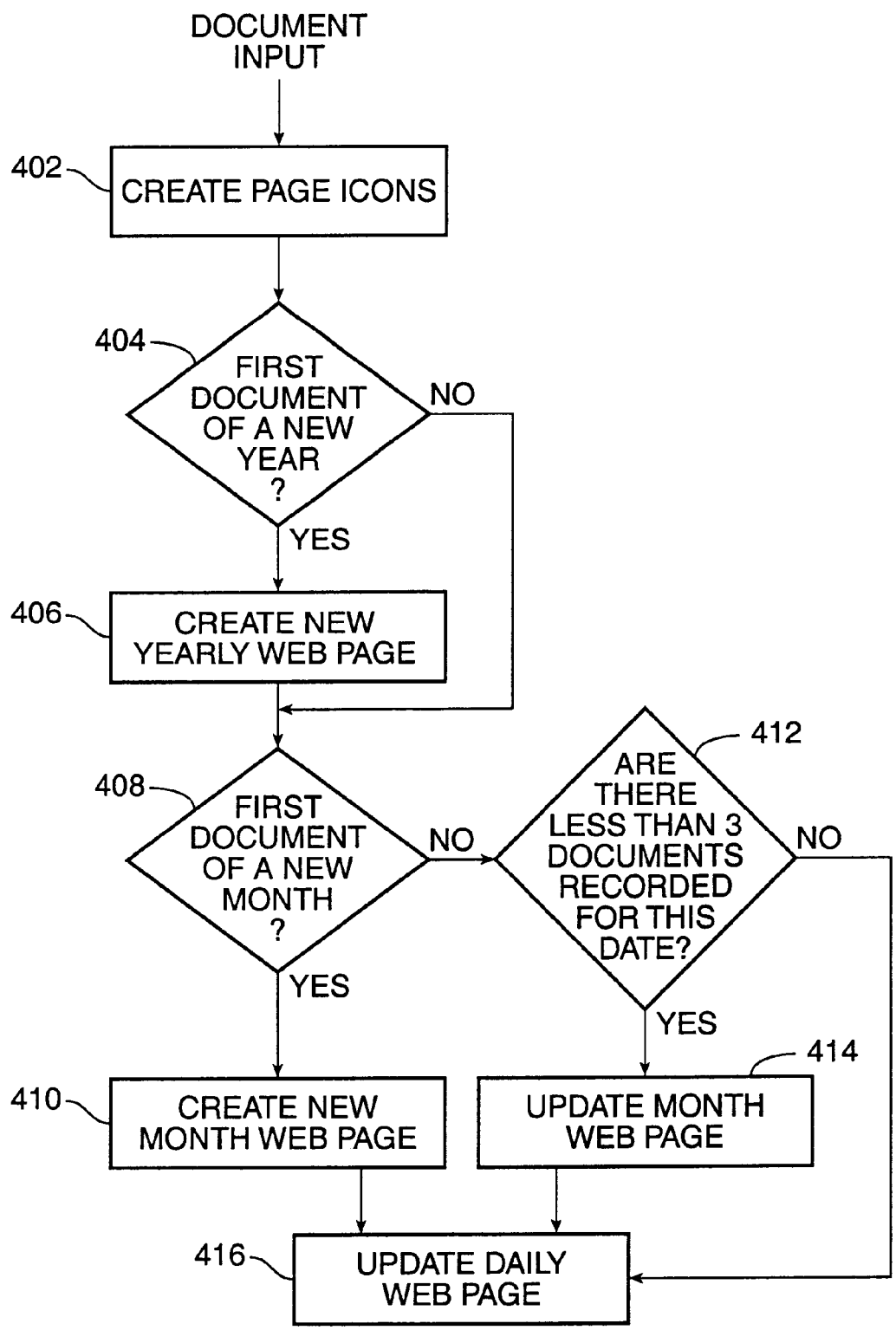
FIG. 4 is a flowchart describing steps of operating a calendar daemon according to one embodiment of the present invention.

FIG. 4 is a flowchart describing steps of operating calendar daemon 304 according to one embodiment of the present invention. Many of the steps of the flowchart of FIG. 4 involve a determination that depends on the time associated with a newly received document. At step 402, calendar daemon 304 creates icons representing the pages of a document received from document sources 302. At step 404, calendar daemon 304 determines if the received document is the first document having an associated time corresponding to a new year to be included in calendar view 306. If the received document is the first document of the new year, calendar daemon 304 creates a new web page corresponding to the new year to be a part of year view 310 at step 406. If the received document is not the first document of the new year, or after step 406, calendar daemon 304 determines whether the received document has an associated time indicating that it is the first document of a new month at step 408. If the received document is the first document of a new month, at step 410, calendar daemon 304 creates a new web page to be a part of month view 312.

Calendar daemon 304 can also generate a number of year views and month views in advance of the date associated with the first document of a new year or new month. This facilitates the user's ability to associate documents with events in the future using the GUI on client system 202 Upon a determination that the received document is not the first document of a new month, calendar daemon 304 determines whether fewer than three documents having the date associated with the newly received document have already been included in calendar view 306 at step 412. The monthly web page is preferably not updated where three documents are already listed for the date of the newly received document, because each date must use only a limited amount of screen space for displaying icons if the entire month is to be viewed on one screen. Thus, if there are fewer than three documents for that date, the appropriate monthly web page is updated at step 414. On the other hand, if there are three or more documents for that date, only a daily web page forming a part of daily view 314 is updated at step 416. Step 416 also follows steps 410 and 414.

Figure 5:
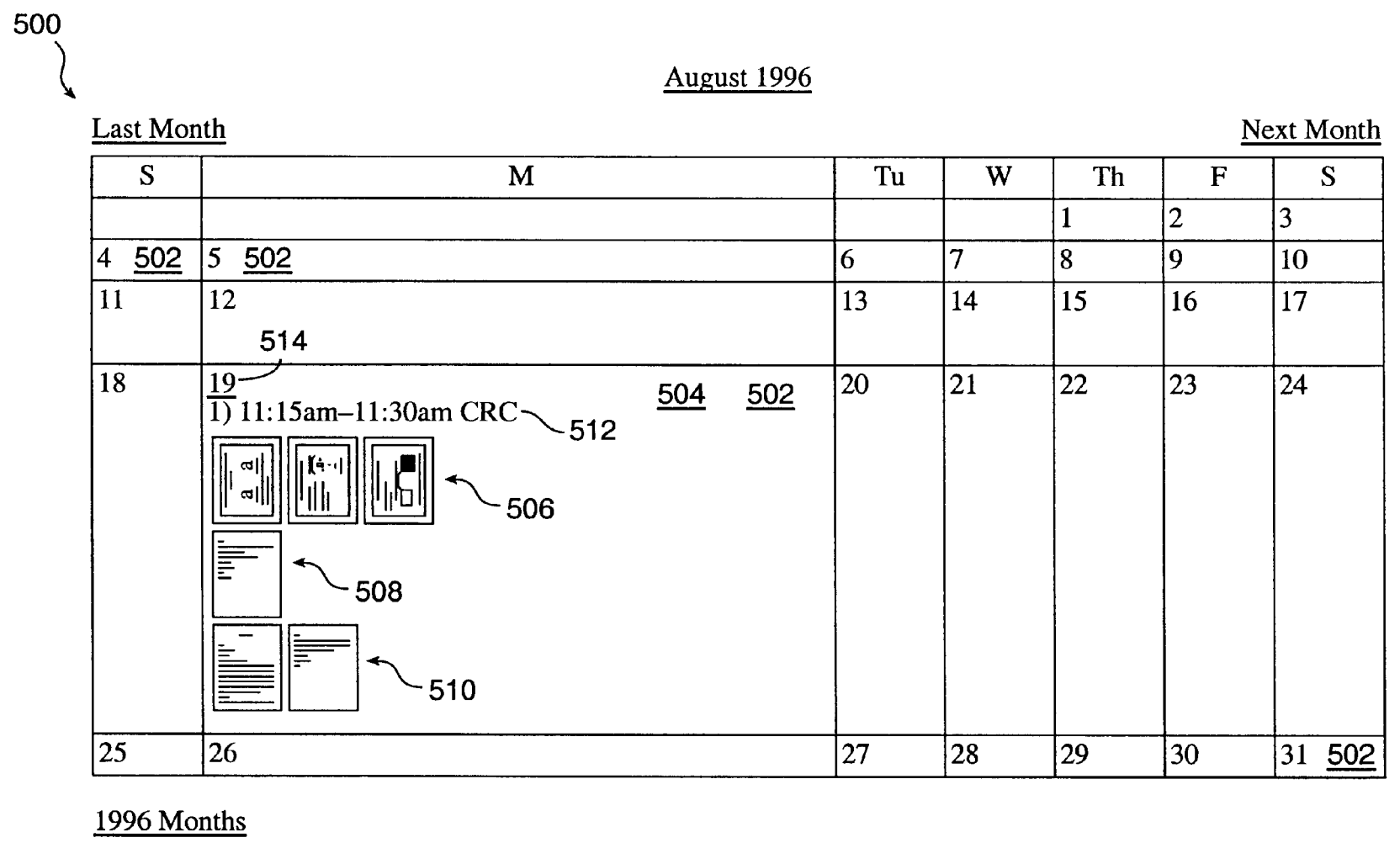

FIG. 5 depicts part of a monthly calendar view according to one embodiment of the present invention. A monthly display page 500 for a particular month is preferably implemented as an HTML page. Monthly display page 500 forms a part of month view 312. Monthly display page 500 is the general form of a conventional monthly calendar and includes a table with multiple cells 502, where individual cells correspond to individual dates. For example, a particular cell 504 includes three documents. A first document 506 has three icons corresponding to three pages, a second document 508 has one page, and a third document 510 has two pages. In addition, there is textual information 512 reminding the user of a meeting that occurred that day. The textual information could also originate from any of the sources mentioned in connection with event sources 308. Due to limited screen size, each cell 502 is limited to showing three documents and three pages in each document.

In monthly display page 500, each cell 502 includes a date numeral 514. Each date numeral 514 is a hypertext link to a page forming a part of daily view 314.

In an alternative embodiment, the monthly views may be cascaded to implement a scrolling calendar. A scroll bar is provided that allows scrolling through the various monthly views. What is displayed at any one time is a range of weeks that may be approximately one month long but does not necessarily correspond to any particular month. Like depicted monthly display page 500, this display also shows cells corresponding to individual dates. The user may also click on a cell to cause the week containing the selected date to become the middle of the displayed range of weeks. This scrolling calendar is highly advantageous when reviewing events and document images spread over days that occur at the end of one month or the beginning of the next month.

Figure 6:
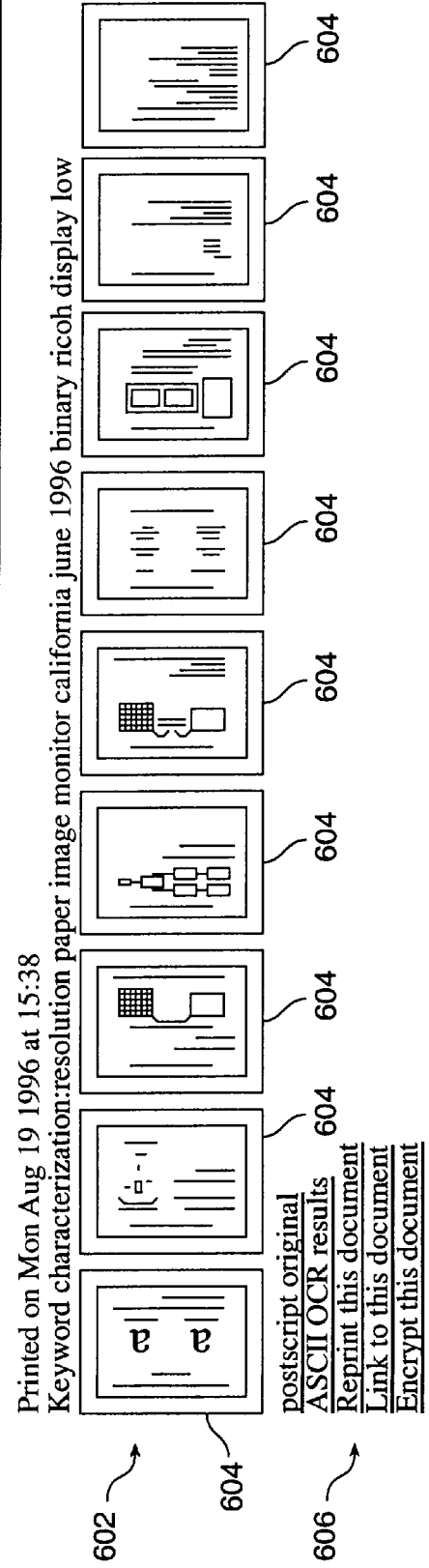
FIG. 6 depicts a daily calendar view according to one embodiment of the present invention.

FIG. 6 depicts part of a daily calendar view according to one embodiment of the present invention. A daily web page 600 forms a part of daily view 314. Daily web page 600 shows a complete list of documents and pages for a particular day. Depicted daily web page 600 shows one document 602. If there are multiple documents they are preferably presented in order of time. Each page of document 602 is represented by an individual icon 604. Each icon 604 is a hypertext link leading to a larger image, e.g., a gif file, presenting a readable version of the page. Other textual information presented with each document 602 includes the date and time of printing and keywords found in the document. Separate hypertext links 606 provide access to a Postscript™ file, to an ASCII version of the document obtained by OCR, and functions to encrypt and create a new printed copy of the document.

There are also yearly web pages forming a part of year view 310. Each yearly web page (not shown) contains the names of the months, each month name being a hypertext link to a monthly web page.

Several aspects of the icons displayed on the calendar may be manipulated to indicate the source of the document and the number of copies of the document that were generated. For example, the color of a document icon border may indicate the document image source. A blue border may indicate documents processed by a copier; a red border may indicate printed documents, etc. Also offset, overlaid icons indicate the number of document copies that were processed.

The presentation of document icons provided by the present invention provides a number of advantages. The hierarchical arrangement of years, months, and days, in a hypertext system makes searches intuitive and rapid. The chronological framework of documents is familiar to users since office documents are often manually filed in time order.

Figure 7:
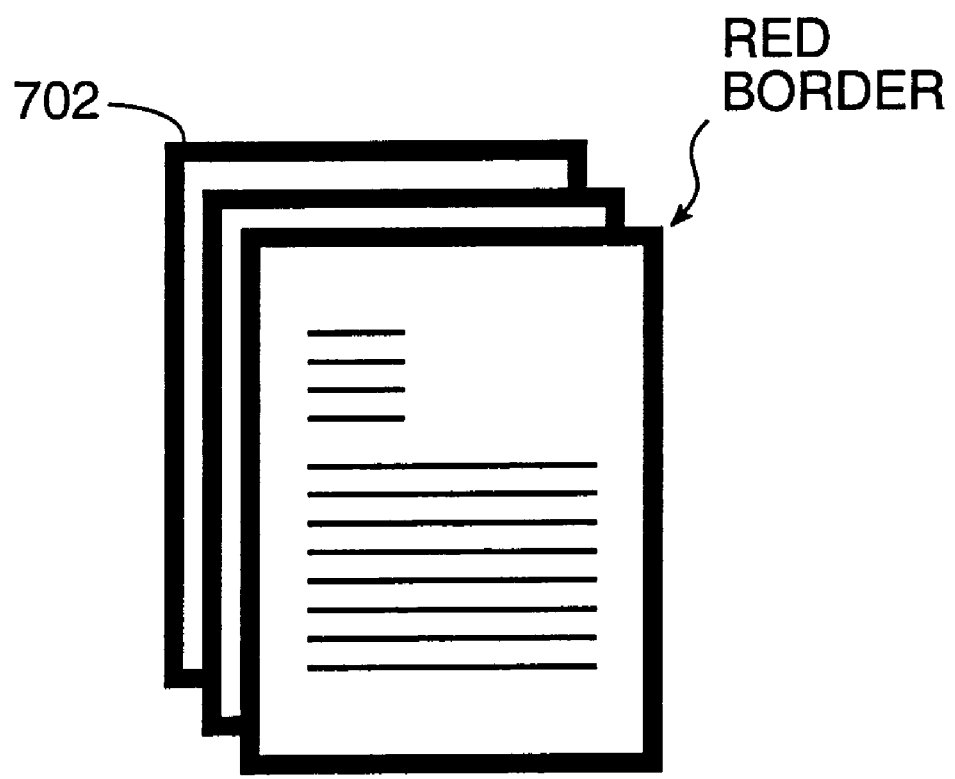
FIG. 7 depicts a particular document icon in accordance with one embodiment of the present invention.

The textual information included in month view 312 serves as a mental prompt, reminding the user of events occurring at the time the documents were processed. Since documents are frequently prepared 'just in time' for particular meetings or travel, the user may more easily recognize the required icon by proximity to text describing the scheduled event. FIG. 7 shows an icon 700 to indicate three printed copies of a one-page document.

An additional GUI (not shown) operating on client system 202 associated with month view 312 or daily view 310 may facilitate user selection of documents to be associated with future times. For example, if the user has a meeting scheduled at some future time, e.g., November 5 at 10:00 AM, the user may in advance of the meeting drag and drop those documents in the calendar cell for November 5. Just before that meeting, e.g., at 9:30 AM, the user, reminded that the meeting is about to occur uses the monthly view 312 or daily view 310 to display and print the documents. This saves the user the effort of manually storing the printed paper copies of those documents and eliminates the possibility that they might be lost before the meeting occurs.

In a preferred embodiment, once a time associated with a document has passed, the user cannot change the calendar view information associated with the document. This insures that users cannot accidentally delete their archive.

In a preferred embodiment, calendar view 306 is formed for a particular user. In an alternate embodiment, calendar view 306 is formed for multiple users, e.g., an entire department.

The invention has been explained with reference to specific embodiments. Other embodiments will be apparent to those of ordinary skill in the art. Merely by way of example, textual information for events may be included in daily web pages. Textual information for events and document icons may be listed in chronological order. Each view may be printed. The views may include a bar code or other machine-readable information to facilitate user access to the document upon printing of the view. Also, event text may include information such as a person's location collected from active badges as described in Pier, K. *Active Badge Panel*, Proceedings of the Conference on Organizational Computing Systems, Atlanta, Ga., Nov. 5–8, 1991, the contents of which are herein incorporated by reference. It is therefore not intended that this invention be limited, except as indicated by the appended claims.

What is claimed is:

1. A method for providing a user interface for accessing a document image, said method comprising:

receiving information indicating at least one time associated with a document image, said time comprising a time of day and a date; and forming a calendar view, said calendar view showing an icon representing said document image at a location determined by said time associated with said document image; wherein said icon comprises descriptive and actual information from said document image, wherein said calendar view comprises a plurality of cells, each of said cells corresponding to a particular date, wherein each of said cells displays icons of document images associated with said particular date.

2. The method of claim 1 wherein said time associated with said document image comprises a time associated with an event related to processing said document image.

3. The method of claim 2 wherein said time associated with said document image comprises a future time.

4. The method of claim 2 wherein said event related to processing said document image comprises printing of said document image.

5. The method of claim 2 wherein said event related to processing said document image comprises faxing of said document image.

6. The method of claim 2 wherein said event related to processing said document image comprises copying of said document image.

7. The method of claim 2 wherein said event related to processing said document image comprises e-mailing of said document image.

8. The method of claim 2 wherein said event related to processing said document image comprises retrieval of said document image from a network.

9. The method of claim 2 wherein said event related to processing said document image comprises scanning said document image.

10. The method of claim 1 further comprising:

obtaining information identifying a non-document related event and a time associated with said non-document related event.

11. The method of claim 9 wherein said non-document related event comprises a news event.

12. The method of claim 10 wherein said non-document related event comprises an appointment.

13. The method of claim 10 wherein said non-document related event is extracted from a calendar manager.

14. The method of claim 10 wherein said non-document related event is extracted from the internet.

15. The method of claim 10 further comprising:

including a representation of said non-document related event in said calendar view at a location indicative of said time associated with said non-document related event.

16. The method of claim 1 wherein said forming comprises:

developing a hypertext link associated with said icon, wherein selection of said hypertext link causes display of said document image.

17. The method of claim 16 wherein selection of said hypertext link causes display of at least one of a plurality of hypertext links, wherein selection of said at least one of a plurality of hypertext links causes display of said document image.

18. The method of claim 1 wherein said calendar view comprises a month view.

19. The method of claim 18 wherein said month view comprises a table comprising a plurality of cells, wherein each of said cells corresponds to a date, at least one of said cells including said icon.

20. The method of claim 1 further comprising:
displaying said calendar view.

21. The method of claim 1 wherein said descriptive information comprises actual content of said document image.

22. The method of claim 1 wherein said descriptive information comprises document source information.

23. The method of claim 1 wherein said descriptive information comprises document history information.

24. The method of claim 1 further comprising displaying said time of day along with said icon.

25. The method of claim 1 wherein said calendar view further comprises a date numeral, said date numeral having a hypertext link, selection of said hypertext link associated with said date numeral causes a listing of said document images for a particular day associated with said date numeral.

26. A computer product for providing a user interface for accessing a document image, said product comprising:
code for obtaining information indicating a time associated with said document image, said time comprising a time of day and a date;
code for forming a calendar view, said calendar view showing an icon representing said document image at a location determined by said time associated with said document image; and
a computer-readable storage medium for storing the codes; wherein said icon comprises descriptive and actual information from said document image, wherein said calendar view comprises a plurality of cells, each of said cells corresponding to a particular date, wherein each of said cells displays icons of document images associated with said particular date.

27. The product of claim 26 wherein said time associated with said document image comprises a time associated with an event related to processing said document image.

28. The product of claim 27 wherein said time associated with said document image comprises a future time.

29. The product of claim 27 wherein said event related to processing said document image comprises printing of said document image.

30. The product of claim 27 wherein said event related to processing said document image comprises faxing of said document image.

31. The product of claim 27 wherein said event related to processing said document image comprises copying of said document image.

32. The product of claim 27 wherein said event related to processing said document image comprises e-mailing of said document image.

33. The product of claim 27 wherein said event related to processing said document image comprises retrieval of said document image from a network.

34. The product of claim 27 wherein said event related to processing said document image comprises scanning said document image.

35. The product of claim 26 further comprising:
code for obtaining information identifying a non-document related event and a time associated with said non-document related event.

36. The product of claim 35 further comprising:
code for including a representation of said non-document related event in said calendar view at a location indicative of said time associated with said non-document related event.

37. The product of claim 35 wherein said non-document related event comprises a news event.

38. The product of claim 35 wherein said non-document related event is extracted from the internet.

39. The product of claim 26 wherein said forming code comprises:
code for developing a hypertext link associated with said icon, wherein selection of said link causes display of said document image.

40. The product of claim 39 wherein selection of said hypertext link causes display of at least one of a plurality of hypertext links, wherein selection of said at least one of a plurality of hypertext links causes display of said document image.

41. The product of claim 26 wherein said calendar view comprises a month view.

42. The product of claim 41 wherein said month view comprises a table comprising a plurality of cells, wherein each of said cells corresponds to a date, at least one of said cells including said icon.

43. The product of claim 35 wherein said non-document related event comprises an appointment.

44. The product of claim 35 wherein said non-document related event is extracted from a calendar manager.

45. The product of claim 37 further comprising:
code for displaying said calendar view.

46. The product of claim 26 wherein said descriptive information comprises actual content of said document image.

47. The product of claim 26 wherein said descriptive information comprises document source information.

48. The product of claim 26 wherein said descriptive information comprises document history information.

49. The product of claim 26 wherein said time of day is displayed along with said icon.

50. The product of claim 26 wherein said calendar view further comprises a date numeral, said date numeral having a hypertext link, selection of said hypertext link associated with said date numeral causes a listing of said document images for a particular day associated with said date numeral.

51. A computer system configured to provide a user interface for accessing a document image, said computer system comprising:
a processor for executing instructions; and
a memory coupled to said processor, said memory storing said instructions for:
updating a calendar view, responsive to an event related to the processing of said document image, by adding information relating said document image and a time associated with said event related to the processing of said document image, said time comprising a time of day and a date; and
transmitting said calendar view via a network, said calendar view showing an icon representing said document image at a location determined by said time associated with said document image, wherein said icon comprises descriptive and actual information from said document image, wherein said calendar view comprises a plurality of cells, each of said cells corresponding to a particular date, and wherein each of said cells displays icons of document images associated with said particular date.

52. The product of claim 51 wherein said time of day is displayed along with said icon.

53. A method for providing a user interface for accessing a document image, said method comprising:

receiving information indicating at least one time associated with a document image, said time comprising a time of day and a date; and forming a calendar view, said calendar view showing an icon representing said document image at a location determined by said time associated with said document image; wherein said icon comprises descriptive and actual information from said document image, wherein said calendar view comprises a plurality of cells, each of said cells corresponding to a particular date, and wherein each of said cells displays icons of document images associated with said particular date.

54. A computer product for providing a user interface for accessing a document image, said product comprising:

code for obtaining information indicating a time associated with said document image, said time comprising a time of day and a date;

code for forming a calendar view, said calendar view showing an icon representing said document image at a location determined by said time associated with said document image; and a computer-readable storage medium for storing the codes; wherein said calendar view comprises a plurality of cells, each of said cells corresponding to a particular date, wherein each of said cells displays icons of document images associated with said particular date; wherein said icon comprises descriptive and actual information from said document image.

55. A computer system configured to provide a user interface for accessing a document image, said computer system comprising:

a processor for executing instructions; and a memory coupled to said processor, said memory storing said instructions for:

updating a calendar view, responsive to an event related to the processing of said document image, by adding information relating said document image and a time associated with said event related to the processing of said document image, said time comprising a time of day and a date; and transmitting said calendar view via a network, said calendar view showing an icon representing said document image at a location determined by said time associated with said document image; wherein said calendar view comprises a plurality of cells, each of said cells corresponding to a particular date, wherein each of said cells displays icons of document images associated with said particular date; wherein said icon comprises descriptive and actual information from said document image.

* * * * *